Figure 1:
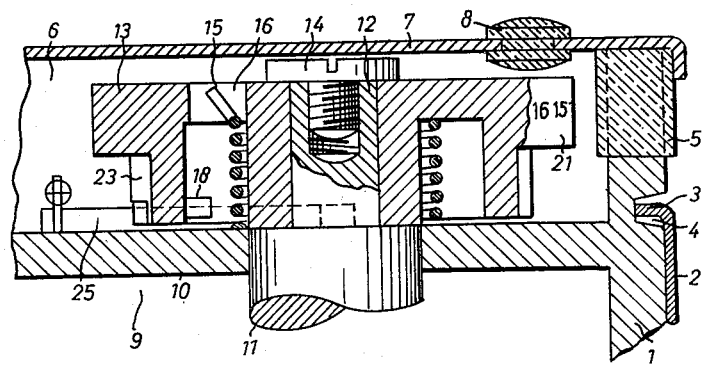

Feb. 18, 1964    K. H. LANGE    3,121,378
COUNTER MECHANISM, PARTICULARLY FOR PHOTOGRAPHIC CAMERAS
Filed July 26, 1961

INVENTOR:
KARL HEINZ LANGE
By
Attorney

United States Patent Office 3,121,378
Patented Feb. 18, 1964

3,121,378
COUNTER MECHANISM, PARTICULARLY FOR PHOTOGRAPHIC CAMERAS
Karl Heinz Lange, Bunde-Ennigloh, Westphalia, Germany, assignor to Balda-Kamerawerk Rudolf Grüter, Kommanditgesellschaft, Bunde, Westphalia, Germany, a German company
Filed July 26, 1961, Ser. No. 126,921
Claims priority, application Germany July 29, 1960
15 Claims. (Cl. 95—31)

This invention relates to counters such as are used, in particular, in photographic cameras. However, the counter of the invention is not restricted to such use but can be used in many similar applications where sequential operations have to be counted. A particular advantage of the invention is that it makes possible the provision of a counter which can very easily be adapted for use in applications in which it is necessary to have a counter of such a construction as will automatically return to zero upon the operation of an operating member. Such an operating member may be a push-button or, in cases where the invention is applied to a photographic camera, it may be constituted by the rear wall of the camera. In this latter case, opening of the rear wall of the camera leads to the counter being re-set to zero.

Photographic camera film counters having the last-mentioned facility are already known, but the known counters have considerable disadvantage as compared with the counter of the present invention. These disadvantages consist particularly in the fact that both the film transport lever and the counter escapement lever are mounted on a common movable plate and, in the case of automatic re-setting, have to be swung out of engagement with a rack or like toothed member forming part of the counter. Another disadvantage of these counters is that although they return to zero, they cannot be re-set to zero with a stepwise action as is readily possible with the counter of the present invention.

This facility is particularly important in connection with miniature cameras, in order that the user may know, when re-winding the film into the cassette, exactly how far back he has wound, so that he does not re-wind the film completely back into the cassette by mistake. If the back wall of the camera is opened after the film has been re-wound, the counter of the invention immediately returns to its zero position. If the opportunity for counting back is utilised, the counter again jumps back by the amount that has not yet been counted back.

There is, therefore, no manual setting of the counter and no slots or the like, open to the exterior, have to be provided to enable the counter to be re-set to zero after the insertion of a new film.

Whenever a new film is inserted in a camera fitted with a counter constructed in accordance with the invention, there is absolute certainty that the number appearing on the counter agrees with the number of exposures actually made.

Figure 2:
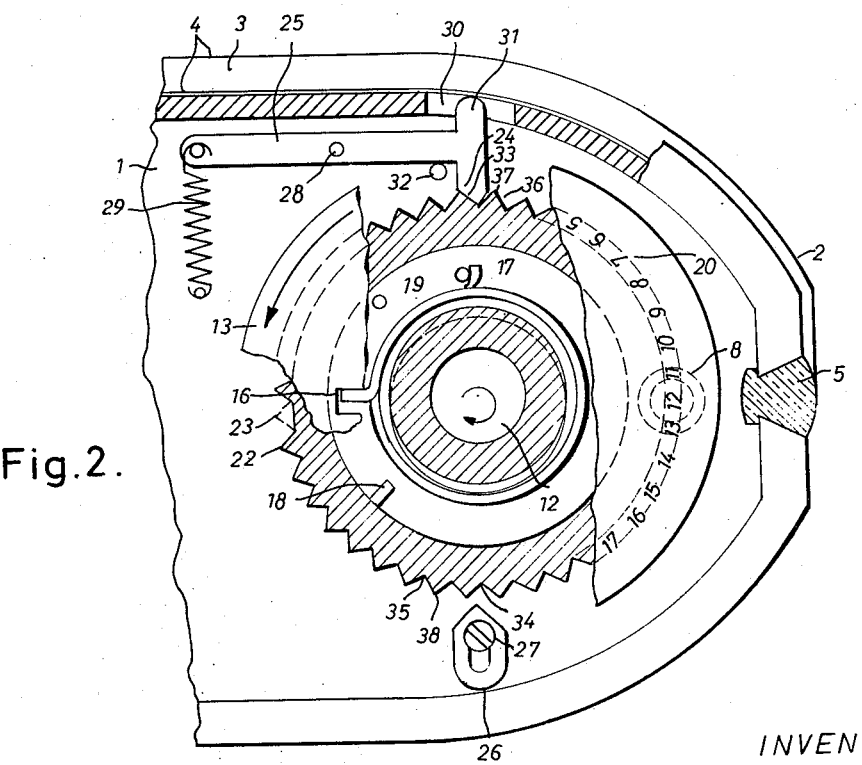

The invention will be described in detail, and by way of example only, with reference to one particular form of counter constructed in accordance therewith and shown in the accompanying drawings in which:

FIGURE 1 is a section through a part of a photographic camera, showing the counter of the invention fitted thereto; and FIGURE 2 is a plan view of the arrangement shown in FIGURE 1, but with the cap or cover removed and with parts of the counter shown in section.

Referring to the drawings, the camera includes a housing 1 and a back-wall portion 2 mounted on the housing by means of a flange 3 which serves as a light trap and which is engaged in a groove 4 formed in the wall of the housing 1. A reading magnifier 5 is mounted in an opening in the wall of the housing 1. The counter of the invention is disposed in a chamber 6 in the housing, the chamber 6 being closed by a cap 7. Another reading magnifier 8 is mounted in an opening in the cap 7. A shaft 11 which extends in the film chamber 9 of the housing 1 is journalled in the partition 10 which divides the counter chamber 6 from the film chamber 9. At one of its ends the shaft 11 has a pin 12 mounted thereon, eccentrically with regard to the axis of the shaft 11. A counter wheel 13 is mounted on the pin 12 so as to be turnable about the latter and is retained in position on the latter by means of a screw 14. A torsion spring 15 has one of its ends engaged in a slot 16 in the counter wheel 13 and its other end engaged behind a stop 17 fixed on the housing. The torsion spring 15 tends to turn the counterwheel 13 about the pin 11 into the position in which the stop 18 carried thereby strikes another stop 19 fixed to the housing. Scales 20 and 21 respectively are provided on the upper face and on the outer cylindrical surface of the counterwheel 13 and the markings thereon can be read by means of the magnifiers 5 and 8. It would, however, be sufficient if only one of these scales were provided, together with the associated magnifier.

The external cylindrical surface of the counter 13 is also formed with teeth forming a rack 22. In cases where space is restricted the teeth 22 could equally well be provided on the internal cylindrical surface of the wheel 13. The tooth 23 is cut away at its lower part, that is to say at the level at which the other teeth engage a nose 24 provided on a lever 25. On the other hand, another nose 26 which is held in position by a screw 27 so as to be capable of adjustment towards and away from the axis of the shaft 11 is mounted at such a height that it co-operates with the remaining upper part of the cut-away tooth 23. The lever 25 is pivotally mounted on a pin 28 and is biassed by means of a spring 29. Thus, the feeler portion 31 of the lever 25 is urged through the opening 30 into engagement with the light-trap flange 3. As a result, when the back wall 2 is opened or removed the nose 24 of the lever 25 is disengaged from the cleft 33 in the rack 22 of the counterwheel 13. In addition to the cleft 33, the clefts 34, 35 and 36 and the teeth 37 and 38 of the rack 22 will be referred to hereinafter for the purposes of explanation.

Once the back wall 2 is closed again, the pressure applied to the feeler portion 31 by the flange 3 moves the lever 25 into engagement with the stop 32, against the action of the spring 29, and re-engages the nose 24 with the rack 22 of the counterwheel 13. The function of the lever 25 would be performed equally well by a member slidably moving in a groove in the housing 1 and in that case the pivot pin 28 can be dispensed with.

The mode of operation of the counter is as follows:

The position of the shaft 11 and of the parts of the counter as shown in the drawings is the position of rest of the counter. In this position, the counter 13 mounted on the eccentric pin 12 is so disposed that the rack 22 thereon engages the lever 25, with the cleft 33 of the rack bearing securely pressed against the nose 24 of the lever 25. If the shaft 11 now rotates in the direction of the inner arrow in FIGURE 2, the eccentric pin 12 causes the counterwheel 13 to be gyrate, the said wheel thus being displaced by an amount corresponding to the width of one tooth of the rack 22 so that the cleft 33 is disengaged from the cam 24. During the first part of this gyratory movement of the counterwheel 13 the crown of the tooth 38 moves up to and passes the cam 26, and during the subsequent movement the tooth gap 35 engages the cam 26.

When the shaft 11 has turned through only 180°, the cam 26 is in the tooth gap 35 just as in the starting position the cam 24 was in the cleft 33. During the next 180° of the rotation of the shaft 11, the crown of the tooth 37 moves, in an analagous manner, past the cam 24. Meanwhile the counter 13 at the same time pivots about the cam 26 and the cam 26 is thus disengaged from the cleft 35 while the cam 24 is engaged with the corresponding cleft at the opposite side of the wheel 13. Thus the wheel 13 is advanced by one step in the direction of the outer arrow in FIGURE 2. The torsion spring 15 is now further tensioned and the stop 18 is rotated relatively to the stop 19 fixed on the housing. If this process is repeated until the stop 18 reaches the stop 19 fixed on the housing, the scale 20 or 21 meanwhile moving past the corresponding magnifier 8 or 5, the partially cut-away tooth 23 moves up to the nose 24. However, since the tooth 23 is cut away in the region of the nose 24, the counter wheel 2 is not advanced in this case but makes an idle pass. In these conditions a clearly audible "click" is heard, as the tooth which is situated opposite the tooth 23 slips away from the nose 26, and the photographer can use this as an acoustic indication that he has reached the last exposure of the film.

If the design of the camera is such that the shaft 11 rotates in the reverse direction on the winding back of the film, as would generally be the case if the shaft 11 is constituted by the shaft of the spool upon which the film is supplied, the counter wheel 13 turns back to zero during winding back of the film. If, however, the shaft 11 remains stationary during the re-winding of the film, as would generally be the case if the shaft 11 were constituted by the shaft of the film take-up spool, then the counter wheel 13 returns to zero upon the opening of the back wall 2.

This latter restoring movement happens because the light-trap flange 3 is released from engagement with the feeler 31. Hence the spring 29 causes the lever 25 to pivot so as to disengage the nose 24 from the rack 22. The torsion spring 15 now causes the counter wheel 13 to be turned back until the stop 18 strikes against the stop 19 fixed on the housing 1.

The arrangement of mounting the counter wheel 13 on the eccentric pin 12 carried by the driving shaft 11 has the advantage that the use of a pawl and of a lifting mechanism for such pawl is avoided.

Another advantage is that the counter can be constructed substantially concentrically with regard to one of the main rotational axes of the camera, that is to say, either with regard to the axis of the spool upon which the film is supplied to with regard to the axis of the film take-up spool.

I claim:

1. A counter mechanism for registering successive revolutions of a shaft, comprising a pin projecting endwise from said shaft and having its axis eccentrically spaced from the axis of rotation of said shaft, a counter wheel mounted on said pin for eccentric movement therewith during rotation of said shaft, a toothed rack extending circumferentially of said wheel and two stops disposed at opposite sides of said wheel, said rack comprising teeth of a radial depth greater than the eccentricity of said pin, adapted to be engaged alternately with one and the other of said stops during eccentric movement of said wheel, whereby said wheel is advanced during each complete revolution of said shaft.

2. In a photographic camera having a rotatable shaft for a film supply or take-up spool, exposure counter mechanism comprising a pin projecting endwise from said shaft and having its axis eccentrically spaced from the axis of rotation of said shaft, a counter wheel mounted on said pin for eccentric movement therewith during rotation of said shaft, a toothed rack extending circumferentially of said wheel and two stops disposed at opposite sides of said wheel, said rack comprising teeth of a radial depth greater than the eccentricity of said pin, adapted to be engaged alternately with one and the other of said stops during eccentric movement of said wheel, whereby said wheel is advanced during each complete revolution of said shaft.

3. Mechanism according to claim 1, wherein said rack is formed on an outwardly directed cylindrical surface of said wheel.

4. Mechanism according to claim 1, wherein said rack is formed on an inwardly directed cylindrical surface of said wheel.

5. Mechanism according to claim 1, wherein said rack is formed on a cylindrical surface of said wheel, said stops being spaced from one another lengthwise of the longitudinal axis of said cylindrical surface and one of said teeth being cut away at the portion of its length at which it would otherwise be engaged by one of said stops.

6. Mechanism according to claim 1, including a restoring spring the tension of which is increased during successive advance of said wheel away from an initial position of the latter.

7. Mechanism according to claim 6, wherein one of said stops is movable into and out of an operative position in which it is adapted to be engaged by said rack, said wheel being rotatable back to said initial position under the action of said restoring spring, upon said stop being moved out of said operative position.

8. Mechanism according to claim 1, wherein one of said stops is slidably mounted for movement into and out of an operative position in which it is adapted to be engaged by said rack, said sliding movement of said stop out of said operative position serving to free said wheel for restoration to an initial position out of which it is advanced during rotation of said shaft.

9. Mechanism according to claim 1, including a pivotally mounted lever upon which one of said stops is mounted, pivotal movement of said lever serving to move said stop between an operative position in which it is adapted to be engaged by said rack and a position in which said wheel is free for restoration to an initial position out of which it is advanced during rotation of said shaft.

10. Mechanism according to claim 9, including spring means to bias said lever away from the position in which said one stop is disposed in its operative position and releasable stop means to retan said lever in said position against the action of said spring means.

11. Mechanism according to claim 1, wherein one of said stops is mounted for adjusting movement towards and away from the axis of rotation of said shaft.

12. Mechanism according to claim 1, wherein said wheel has a counter scale marked on a plane surface thereof.

13. Mechanism according to claim 1, wherein said wheel has a counter scale marked on a cylindrical surface thereof.

14. Mechanism according to claim 1, wherein said shaft and said wheel are made of plastic material.

15. A photographic camera having a case-portion which is displaceable out of a closed position to allow loading thereof, a rotatable shaft for a film supply or take-up spool, a pin projecting endwise from said shaft and having its axis eccentrically spaced from the axis of rotation of said shaft, a counter wheel mounted on said pin for eccentric movement therewith during rotation of said shaft, a toothed rack extending circumferentially of said wheel and two stops disposed at opposite sides of said wheel, said comprising teeth of a radial depth greater than the eccentricity of said pin, adapted to be engaged alternately with one and the other of said stops during eccentric movement of said wheel, whereby said wheel is advanced during each complete revolution of said shaft, one of said stops being movable into and out of an operative position in which it is adapted to be engaged with said rack, spring means being provided to bias said one stop away from said operative position and said case-portion being adapted, when in its closed position, to retain said stop in said operative position against the action of said spring means.

References Cited in the file of this patent

UNITED STATES PATENTS

| | | |
|---|---|---|
| 2,358,327 | Harris | Sept. 19, 1944 |
| 2,521,933 | Mihalyi | Sept. 12, 1950 |
| 2,548,172 | Pollock | Apr. 10, 1951 |